US012582573B1

(12) United States Patent
Lai

(10) Patent No.: US 12,582,573 B1
(45) Date of Patent: Mar. 24, 2026

(54) MASSAGER DRIVE MECHANISM AND MASSAGER

(71) Applicant: LONGNAN PINXIN MOTOR CO., LTD., Longnan (CN)

(72) Inventor: Guanxi Lai, Longnan (CN)

(73) Assignee: LONGNAN PINXIN MOTOR CO., LTD, Longnan (CN)

( * ) Notice: Subject to any disclaimer, the term of this patent is extended or adjusted under 35 U.S.C. 154(b) by 0 days.

(21) Appl. No.: 19/176,243

(22) Filed: Apr. 11, 2025

(30) Foreign Application Priority Data

Mar. 7, 2025 (CN) ......................... 202520396064.1

(51) Int. Cl.
*A61H 19/00* (2006.01)

(52) U.S. Cl.
CPC ..... *A61H 19/44* (2013.01); *A61H 2201/1418* (2013.01); *A61H 2201/149* (2013.01)

(58) Field of Classification Search
CPC ........ A61H 19/00; A61H 19/30; A61H 19/34; A61H 19/40; A61H 19/44; A61H 19/50; A61H 2201/1418; A61H 2201/149; A61H 23/02; A61H 23/0254; A61H 2023/0271
See application file for complete search history.

(56) References Cited

U.S. PATENT DOCUMENTS 9,066,843 B1 * 6/2015 Greco .................... A61H 21/00
2010/0130897 A1 * 5/2010 Knyrim .................. A61H 19/44
601/89

* cited by examiner

*Primary Examiner* — Carrie R Dorna
(74) *Attorney, Agent, or Firm* — Ming Jiang; OPENPTO US LLC

(57) ABSTRACT

Disclosed is a massager drive mechanism, including a drive motor, a transmission assembly, a limit bracket, and a plurality of movable push blocks; each of the movable push blocks includes a movable slot and a pushing portion; the transmission assembly includes a plurality of eccentric joints, and each of the eccentric joints includes a connecting portion and an eccentric portion, the connecting portion is configured to connect adjacent eccentric joints, and the eccentric portion abuts against the movable slot; a rotary shaft of the drive motor serves as a first rotary shaft; a farthest point on the eccentric portion from the first rotary shaft is a farthest eccentric end, and a line connecting adjacent farthest eccentric ends forms a first included angle with the first rotary shaft; and the limit bracket is connected to the movable push blocks in a sliding manner.

20 Claims, 9 Drawing Sheets

MASSAGER DRIVE MECHANISM AND MASSAGER

CROSS-REFERENCE TO RELATED APPLICATIONS

The present application claims priority of Chinese Patent Application No. 202520396064.1, filed on Mar. 7, 2025, and the content of which is hereby incorporated by reference in its entirety.

TECHNICAL FIELD

The present disclosure relates to the technical field of massagers, and particularly relates to a massager drive mechanism and a massager.

BACKGROUND

A massage head of an insertable massager usually has functions of extension and retraction, vibration, rotation, flicking, and the like. A massage range of the massage head is relatively small, pressure and friction are concentrated in a local area, making it difficult to fully conform to sensitive areas of a human body. Therefore, a peristaltic massager is available on the market. At present, a drive mechanism of the peristaltic massager toggle articulated skeletons through a bent shaft, thereby causing the massage head to bend.

The existing drive mechanism requires a relatively long skeletal structure to avoid interference between adjacent joints during oscillation, so as to achieve peristaltic effect with sufficient amplitude. However, a massage head that is too long cannot be fully inserted into the human body. As a result, only one small section of the massage head of the peristaltic massager in the prior art is capable of performing limited peristaltic motion in the human body, resulting in relatively poor massage effect.

SUMMARY

In order to solve the problems in the prior art, the present disclosure provides a massager drive mechanism, including a drive motor, a transmission assembly, a limit bracket, and a plurality of movable push blocks;

each of the movable push blocks includes a movable slot and a pushing portion;

the transmission assembly includes a plurality of eccentric joints, and each of the eccentric joints includes a connecting portion and an eccentric portion; the connecting portion is configured to connect adjacent eccentric joints; and the eccentric portion abuts against the movable slot;

a rotary shaft of the drive motor serves as a first rotary shaft;

a farthest point on the eccentric portion from the first rotary shaft is a farthest eccentric end, and a line connecting adjacent farthest eccentric ends forms a non-zero first included angle with the first rotary shaft; and the limit bracket is connected to the movable push blocks in a sliding manner, and a sliding direction of the movable push blocks is parallel to a width direction of the movable slot.

Further, a length of the movable slot is set as L1, a width of the movable slot is set as L2, and a distance between the farthest eccentric end and an axis of the drive motor is L3;

$$0.5\times L1 \geq L3 > L2.$$

Further, the limit bracket is provided with a first guide slot, and a depth direction of the first guide slot is parallel to the width direction of the movable slot; and an end of the pushing portion protrudes from a circumferential contour of the limit bracket in the depth direction of the first guide slot.

Further, the pushing portion penetrates through a circumferential wall surface of the limit bracket;

the movable push block is provided with two pushing portions, and the two pushing portions respectively protrude from the width direction of the movable slot.

Further, two ends of the limit bracket in a length direction serve as the first connecting end and the second connecting end, respectively, and the first connecting end and the second connecting end are connected by a plurality of connecting arms, and the plurality of connecting arms are arranged about a main shaft of the drive motor;

a gap between adjacent connecting arms forms a first guide slot; and a length direction of the first guide slot is parallel to the length direction of the limit bracket, and a width of the gap is a width direction of the first guide slot. Further, the connecting arms form four first guide slots;

where two non-adjacent first guide slots are the first guide slots in a same group, depth directions of the two non-adjacent first guide slots are parallel to each other, and depth directions of the first guide slots in different groups are perpendicular to each other; and length directions of the movable slots of adjacent movable push blocks are perpendicular to each other, and the pushing portions of the adjacent movable push blocks are respectively arranged in the first guide slots in the different groups.

Further, distances between each of the farthest eccentric ends and the first rotary shaft are equal.

Further, the connecting portion is a cylindrical structure, and the eccentric portion is fixed in the connecting portion in an axial direction of the connecting portion. Further, the eccentric portion is a cylindrical structure; and the connecting portion is provided with two connecting holes, each of which is connected to an adjacent eccentric portion; and the connecting hole is a non-rotary structure, and an end of the eccentric portion is inserted into and coupled with the connecting hole.

Further, the eccentric portion farthest from the drive motor is the first eccentric portion, the first eccentric portion is rotatably connected to the limit bracket, and the first eccentric portion is coaxial with the drive motor.

Further, the first eccentric portion is connected to a vibration functional module/telescoping functional module/rotary functional module.

Further, a vibration motor is arranged on a circumferential wall surface of the limit bracket.

Further, a vibration motor is arranged on the pushing portion.

Further, the limit bracket is provided with a guide column, and an axis direction of the guide column is parallel to the first rotary shaft;

the movable push block is provided with a second guide slot;

the guide column extends through the second guide slot and slides in the length direction of the second guide slot, and the length direction of the second guide slot is parallel to the width direction of the movable slot; and long wall surfaces on two sides of the second guide slot abut against the guide column.

Further, two guide columns are arranged, and two second guide slots are arranged, the guide columns are respectively arranged in different second guide slots. Further, the guide column is configured as a cylindrical structure.

Further, the guide column is rotatably connected to the limit bracket.

Further, the pushing portion is an annular structure, and surrounds both the second guide slot and the movable slot.

Further, a circumferential contour of the pushing portion forms an ellipse, and a long axis of the ellipse is parallel to the width direction of the movable slot.

A massager, including any of the aforesaid drive mechanism, and further including a housing and a silicone outer layer, where the drive motor and the limit bracket are fixedly connected to the housing, and the pushing portion of the movable push block abuts against an inner wall surface of the silicone outer layer.

The present disclosure has the following beneficial effects: by using the drive mechanism of the present disclosure, the massager can achieve peristaltic massage of the massage head with only a relatively short skeleton structure, that is, with fewer movable pushing blocks, such that the massage head can be fully inserted into the human body. Moreover, even when an additional functional module is mounted at the end of the shorter skeleton structure, the peristaltic portion of the massage head can still be fully inserted into the human body, thereby achieving better massage effect.

Figure 1:
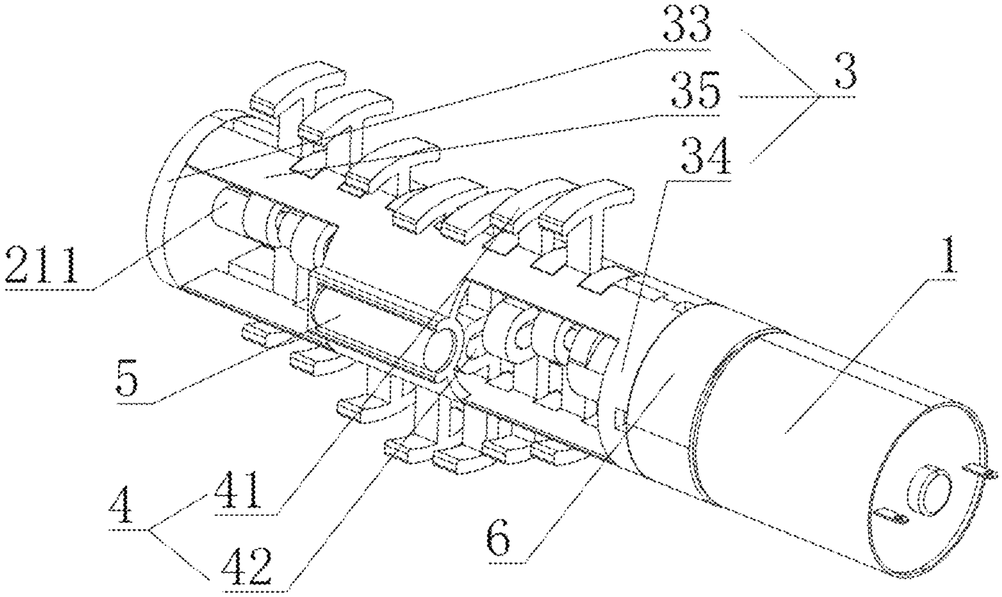
FIG. 1 is a schematic diagram of a three-dimensional structure of a drive mechanism according to one embodiment of the present disclosure.

Reference numerals in the accompanying drawings: 1. drive motor; 11. first rotary shaft; 2. transmission assembly; 21. eccentric portion; 211. first eccentric portion; 212. farthest eccentric end; 2121. first included angle; 22. connecting portion; 221. connecting hole; 23. eccentric joint; 3. limit bracket; 31. first guide slot; 32. guide column; 33. first connecting end; 34. second connecting end; 35. connecting arm; 4. movable push block; 41. pushing portion; 42. movable slot; 43. second guide slot; 5. vibration motor; 6. reduction gearbox; 7. silicone outer layer; and 8. functional module.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Embodiment 1

As shown in FIGS. 1-17.

A massager drive mechanism, including a drive motor 1, a transmission assembly 2, a limit bracket 3, and a plurality of movable push blocks 4;

- each of the movable push blocks 4 includes a pushing portion 41 and a movable slot 42;
- the transmission assembly 2 includes a plurality of eccentric joints 23, and each of the eccentric joints 23 includes a connecting portion 22 and an eccentric portion 21; the connecting portion 22 is configured to connect adjacent eccentric joints 23; and the eccentric portion 21 abuts against the movable slot 42;
- a rotary shaft of the drive motor 1 serves as a first rotary shaft 11;
- a farthest point on each eccentric portion 21 from the first rotary shaft 11 is a farthest eccentric end 212, and a line connecting adjacent farthest eccentric ends 212 forms a non-zero first included angle 2121 with the first rotary shaft 11; and
- the limit bracket 3 is connected to the movable push blocks 4 in a sliding manner, and a sliding direction of the movable push blocks 4 is parallel to a width direction of the movable slot 42.

A long wall surface of the movable slot 42 is a wall surface having two long edges, and a wide wall surface of the movable slot 42 is a wall surface having two wide edges.

A peristaltic massager has recently emerged on the market, the massage head of the peristaltic massager is capable of performs snake-like crawling motion, and different sections of an elongated wand-shaped massage head are alternately titled to both sides in a length direction, forming an approximate S-shape. The peristaltic massager can conforms better to curves of a human body during peristaltic motion, thereby providing more comprehensive massage coverage. At present, a drive mechanism of the peristaltic massager includes a helical shaft that passes through a skeleton formed by a plurality of articulated support units, each of the support units is provided with an elongated slot; when a curved shaft is connected to the motor, some points will be offset outside a rotational axis of the motor, and the points abut against a wall surface in a length direction of the elongated slot during rotation, causing relative rotation between adjacent support units, and the support units oscillate back and forth in a regular pattern to form snake-like peristaltic motion. However, the mechanism that oscillates through support units requires a number of the support units to achieve a complete S-shaped peristaltic effect. As a result, the entire massage device is long and difficult to be fully inserted into the human body, and the mounting of an additional functional module 8 on an end of the massage head will make the massage head longer. Therefore, it is difficult to mounting the functional module 8 to the existing drive mechanism, or more precisely, it is more difficult for a peristaltic massager with a functional module 8 at an end thereof to be inserted deeply into the human body.

The present disclosure provides a massager drive mechanism, where the drive motor 1 is fixedly connected to a housing of the massage, and the drive motor 1 is configured to drive the transmission assembly 2 to rotate, a main shaft of the drive motor 1 may be connected to a reduction gearbox 6 to reduce a rotational speed of the drive motor 1 and obtain greater torque, thereby preventing excessive stimulation, and the greater torque can prevent the massage head from stalling.

The transmission assembly 2 is connected to an output shaft of the reduction gearbox 6 and rotates in unison with the output shaft. As shown in FIGS. 6-9, the transmission assembly 2 is provided with eccentric portions 21 that are eccentric to one another.

As previously described, the massager in the prior art uses a helical shaft with smooth transition between sections. The transmission assembly 2 of the present disclosure functions similarly to a helical shaft, but sections of the transmission assembly 2 in the present disclosure are offset in a stepwise manner, rather than through smooth transition. The present disclosure does not use a helical shaft with smooth transition as the transmission assembly 2 any longer, in contrast, the present disclosure replaces the articulated support units with the movable push blocks 4 that are slidably arranged in the limit bracket 3 in a sliding manner. The articulated support units perform rotational motion, while the sliding portion performs translational motion. In the present disclosure, the sliding direction of the movable push blocks 4 is perpendicular to an axial direction of the transmission assembly 2. When force is applied to the movable push blocks 4 in a direction parallel to an axis of the transmission assembly 2, which will increase a pressure on the adjacent movable push blocks 4 (or a pressure between the movable push block 4 and the limit bracket 3), such that friction force acting on the movable push blocks 4 is increased, and sliding motion of the movable push blocks 4 are hindered.

In contrast, the helical shaft applies inclined force on the movable push blocks 4, drives the movable push blocks 4 to move in an axial direction perpendicular to the helical shaft (a desired motion direction), and also drives the movable push blocks 4 to move in an axial direction parallel to the helical shaft (an undesired motion direction) at the same time.

Figure 8:
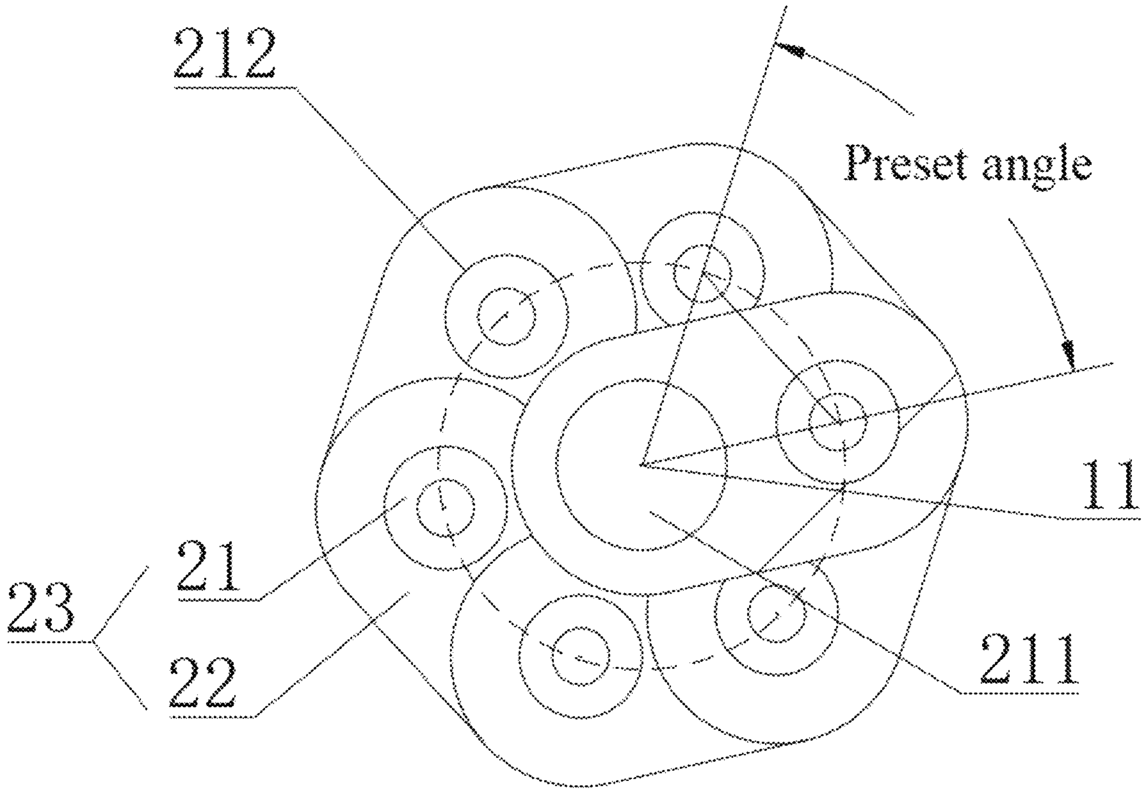
FIG. 8 is a schematic diagram of a preset angle of an eccentric portion according to one embodiment of the present disclosure.
Figure 9:
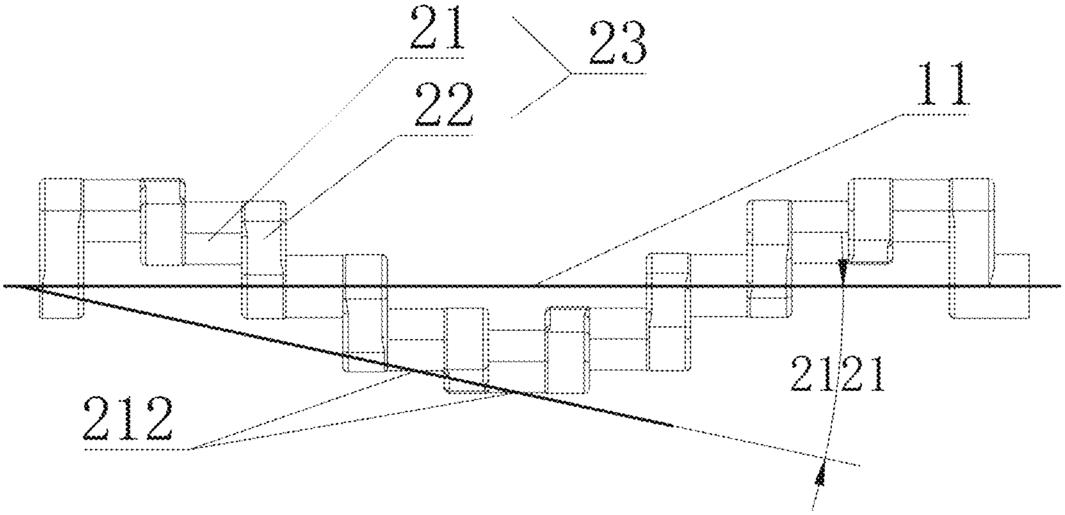
FIG. 9 is a schematic diagram of a first included angle.

As shown in FIGS. 8 and 9, the rotary shaft of the drive motor 1 is the first rotary shaft 11, a plurality of points are formed on an edge contour the eccentric portion 21, distances from the plurality of points to the drive motor 1 are different, and the points farthest from the drive motor 1 are the farthest eccentric ends 212. When the drive motor 1 drives the transmission assembly 2 to rotate, the transmission assembly 2 defines a cylindrical motion space, which represents a maximum coverage area of the transmission assembly 2, and the farthest eccentric ends 212 form a circumferential wall of the cylindrical motion space.

Figure 2:
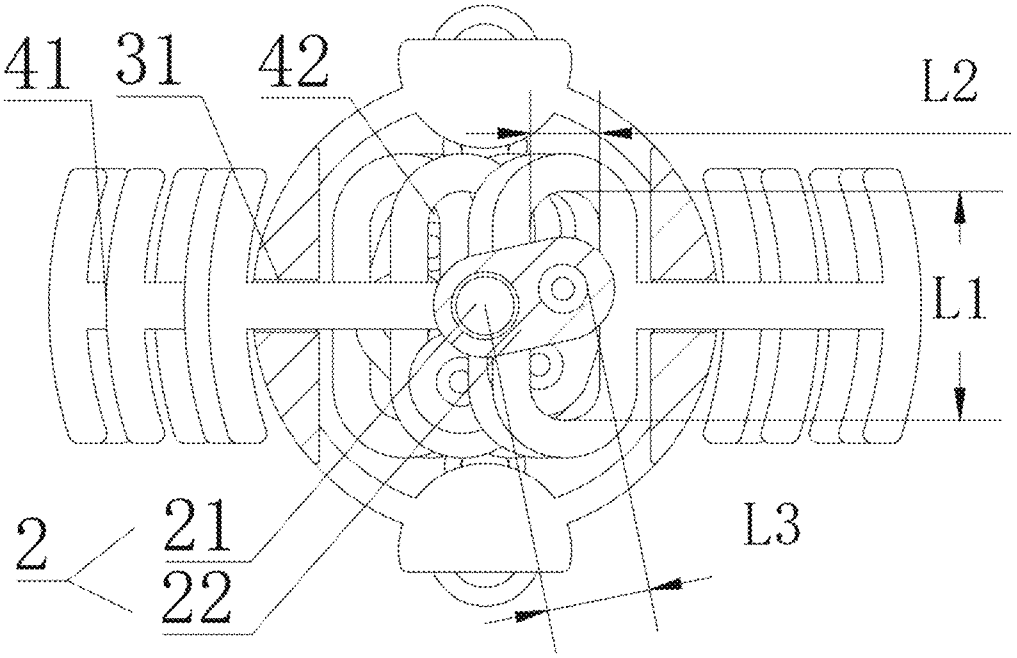
FIG. 2 is a schematic diagram of a front view of a sectional structure of a drive mechanism according to one embodiment of the present disclosure.
Figure 3:
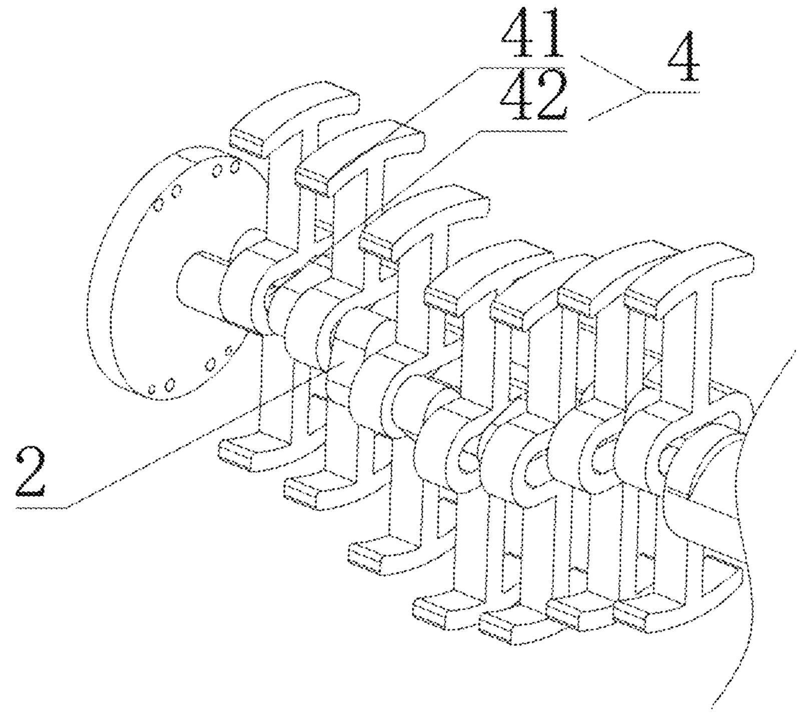
FIG. 3 is structural schematic diagram of a connection between a transmission assembly and a movable push block according to one embodiment of the present disclosure.

As shown in FIGS. 1 and 2, each of the movable push blocks 4 includes a movable slot 42 and a pushing portion 41, an end of the pushing portion 41 protrudes from a circumferential contour of the limit bracket 3, and the end of the pushing portion 41 directly abuts against a silicone outer layer 7 of the massager, thereby providing a massage and pressing effect. The movable slot 42 is formed in a middle of the movable push block 4, a length L1 of the movable slot 42 is much greater than a width L2 thereof, and the width direction of the movable slot 42 is parallel to a direction in which the pushing portion 41 protrudes from the limit bracket 3. The eccentric portion 21 is disposed in the movable slot 42, the farthest eccentric end 212 abuts against a wall surface of the movable slot 42, and each eccentric portion 21 corresponds to one movable push block 4. When the farthest eccentric end 212 rotates to a plane aligned with the width direction of the movable slot 42, the farthest eccentric end 212 pushes a long wall surface (the long wall surface is a wall surface with two long edges) on one side of the movable slot 42, in this case, the farthest eccentric end 212 pushes the movable push block 4 out to a maximum distance, and the movable slot 42 has two long wall surfaces on both sides. The farthest eccentric end 212 abuts against the long wall surfaces on different sides, and a motion direction of the movable push block 4 is reversed. When the farthest eccentric end 212 rotates to a plane aligned with a length direction of the movable slot 42, the farthest eccentric end 212 approaches a wide wall surface of the movable slot 42 (the wide wall surface is a wall surface having two wide edges). Since the movable slot 42 has a relatively long length, the wide wall surfaces on both sides are far apart. When the farthest eccentric end 212 rotates to a plane aligned with a length direction of the movable slot 42, a distance of the movable push block 4 pushes out is a smallest, or even zero.

Specifically, L1 represents a length of the movable slot 42, L2 represents a width of the movable slot 42, and L3 represents a distance between the farthest eccentric end 212 and the first rotary shaft 11, the width L2 of the movable slot 42 can at least accommodate the eccentric portion 21, to ensure that the eccentric portion 21 can be inserted into the movable slot 42 and relatively displaced, such that a gap between the eccentric portion and the movable slot can be minimized, thereby minimizing impact noise and improving the smoothness of the motion of the movable push blocks 4. In addition, the length L1 of the movable slot 42 should be greater than a diameter of the above cylindrical motion space, providing a sufficient clearance space for the farthest eccentric end 212. Therefore, it is required that 0.5×L1>L3, such that when the rotary shaft rotates to a plane parallel to the length direction of the movable slot 42, the movable push block 4 is centered and does not need to move in any direction.

Further, from a front view in a vertical plane of the drive motor 1, as shown in FIG. 8, it can be seen that the farthest eccentric ends 212 of the adjacent eccentric portions 21 are arranged at a preset angle interval, such that a line connecting the adjacent farthest eccentric ends 212 (the adjacent farthest eccentric ends 212 refer to the farthest eccentric ends 212 of different eccentric portions 21, not the farthest eccentric ends of a same eccentric portion 21) forms a non-zero first included angle 2121 with the drive motor 1, that is, the farthest eccentric ends 212 of adjacent eccentric portions 21 are not located on a same straight line, and a line connecting the adjacent farthest eccentric ends 212 is not parallel to the drive motor 1. Therefore, when the farthest eccentric ends 212 of one of the eccentric portions 21 abuts against the long wall surface of the corresponding movable slot 42 (that is, the movable push block 4 is pushed to a farthest end), the adjacent farthest eccentric ends 212 is not in contact with the long wall surface the corresponding movable slot 42, a distance pushed out by the movable push block 4 corresponding to the adjacent farthest eccentric ends 212 is relatively small, and the adjacent movable push blocks 4 form an S-shaped curve. A specific motion position of the movable push block 4 depends on a distance of the farthest eccentric end 212 from the first rotary shaft 11.

Therefore, this embodiment provides an optimal arrangement solution for the eccentric portions 21, as shown in FIG. 8, a distance from the farthest eccentric ends 212 of each of the eccentric portions 21 to the first rotary shaft 11 is equal, and the adjacent farthest eccentric ends 212 are arranged according to a preset angle, that is, arranged around a circumference of the first rotary shaft 11.

Specifically, for example, the preset angle is 60 degrees, a first farthest eccentric end 212 is 0 degree, a second farthest eccentric end is 60 degrees, and a third farthest eccentric end is 120 degrees, in this case, when the first farthest eccentric end 212 pushes a first movable push block 4 to a farthest distance, a second movable push block 4 will be offset in a same direction as that of the first movable push block 4, but an offset distance is shorter; and a third movable push block 4 will be offset in a direction different from that of the second movable push block 4 but has a same offset distance. When the drive motor 1 starts to drive the transmission assembly 2, the first farthest eccentric end 212 will reach a 60-degree position, the second farthest eccentric end 212 will reach a 120-degree position, and the third farthest eccentric end 212 will reach a 180-degree position, in this case, the third movable push block 4 will reach a maximum offset distance, but have a direction in opposite to an initial direction of the first movable push block 4. Similarly, during rotation of the transmission assembly 2, an angle of the previous farthest eccentric end 212 will eventually reach the position of an angle of the next farthest eccentric end 212 before it rotates, such that each movable push block 4 can be offset to a same distance in order, and snake-like peristaltic effect is achieved.

Figure 4:
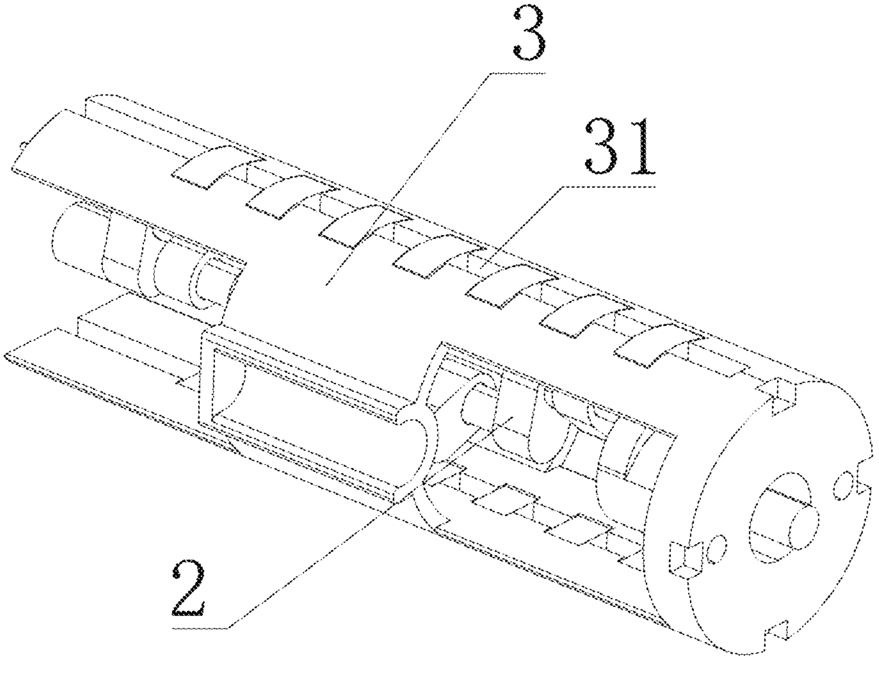
FIG. 4 is a schematic diagram of a three-dimensional structure of a limit bracket according to one embodiment of the present disclosure.

Further, as shown in FIGS. 1 and 4, the limit bracket 3 is needed to restrict a degree of freedom of the movable push block 4 to prevent the movable push block 4 from rotating with the eccentric portion 21. The limit bracket 3 is provided with a first guide slot 31, and a depth direction of the first guide slot 31 is parallel to the width direction of the movable slot 42; and

- an end of the pushing portion 41 protrudes from a circumferential contour of the limit bracket 3 in the depth direction of the first guide slot 31, and slides in the depth direction of the first guide slot 31. When the farthest eccentric end 212 pushes the long wall surface on one side of the movable slot 42, the pushing portion 41 on the same side will press against the human skin, providing massage effect.

More specifically, as shown in FIGS. 1, 2, 10, and 11. Two ends of the limit bracket 3 in a length direction serve as the first connecting end 33 and the second connecting end 34, respectively, and the first connecting end 33 and the second connecting end 34 are connected by a plurality of connecting arms 35, and the plurality of connecting arms 35 are arranged about a main shaft of the drive motor 1.

- a gap between adjacent connecting arms 35 forms a first guide slot 31; and
- a length direction of the first guide slot 31 is parallel to the length direction of the limit bracket 3, and a width of the gap is a width direction of the first guide slot 31.

The limit bracket 3 is composed of the first connecting end 33, the second connecting end 34, and the plurality of connecting arms 35; the first connecting end 33 is fixedly connected to a housing of the drive motor 1, one end of each connecting arm 35 is connected to the first connecting end 33 and extends in a protruding direction of the main shaft of the drive motor 1, and the other end of the each connecting arm 35 is connected to the second connecting end 34.

The gap between adjacent connecting arms 35 forms the first guide slot 31, a direction of the first guide slot 31 parallel to the length direction of the limit bracket 3 is the length direction of the first guide slot 31, and a direction of the width direction of the gap between adjacent connecting arms 35 is the width direction of the first guide slot 31.

Figure 5:
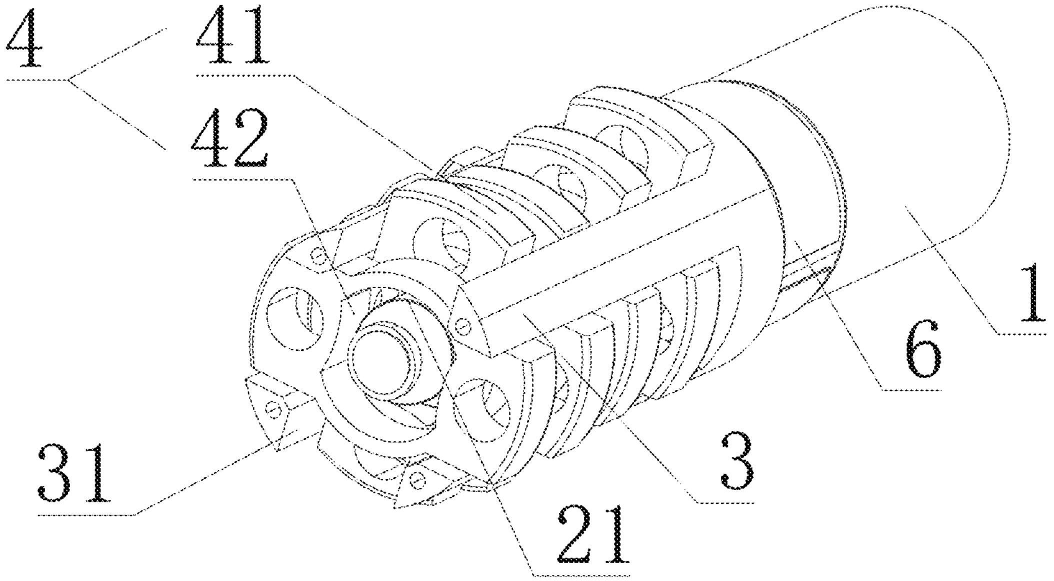
FIG. 5 is a schematic diagram of a three-dimensional structure of a drive mechanism according to another embodiment of the present disclosure.
Figure 6:
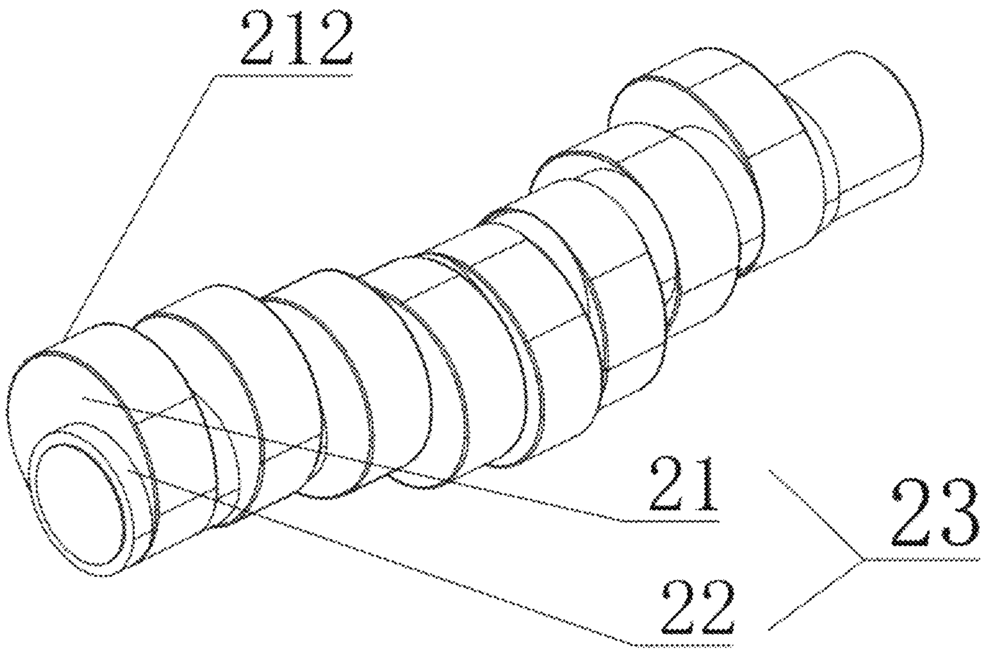
FIG. 6 is a schematic diagram of a three-dimensional structure of a transmission assembly according to one embodiment of the present disclosure.

Further, as shown in FIG. 5, the connecting arms 35 form four first guide slots 31;

- where two non-adjacent first guide slots 31 are the first guide slots 31 in a same group, depth directions of the two non-adjacent first guide slots 31 are parallel to each other, and depth directions of the first guide slots 31 in different groups are perpendicular to each other; and
- length directions of the movable slots 42 of adjacent movable push blocks 4 are perpendicular to each other, and the pushing portions 41 of the adjacent movable push blocks 4 are respectively arranged in the first guide slots in the different groups 31.

The four first guide slots 31 are at least composed of four connecting arms 35, which are arranged in a circular array in an axis direction of the drive motor 1, and four identical first guide slots 31 are accordingly formed; and depth directions of adjacent first guide slots 31 are perpendicular to each other, and depth directions of opposite first guide slots 31 are parallel to each other. The first guide slots 31 with parallel depth directions are considered as a group of guide slots. Orientations of the adjacent movable push blocks 4 are different, and the length directions of the movable slots 42 of adjacent movable push blocks 4 are perpendicular to each other. Correspondingly, motion directions of adjacent movable push blocks 4 are also perpendicular to each other, such that the drive mechanism can perform peristaltic motion in two planes, and more comprehensive massage coverage is achieved.

The structure in the prior art is formed by a plurality of articulated support units, and all the support units must oscillate simultaneously; and each subsequent support unit oscillates at a preset oscillating angle capable of making way for the previous support part to avoid interference with oscillation motion of the previous support unit. Therefore, all the support units can only oscillate in one plane. For example, when the support units oscillate in a horizontal direction, they cannot oscillate in a vertical direction at the same time.

In this embodiment, two groups of first guide slots 31 are provided, guiding directions of the two groups of first guide slots 31 are perpendicular to each other. The length direction of the movable slots 42 of the movable push blocks 4 only needs to be parallel to the guiding directions of one group of first guide slots 31, and the adjacent movable push blocks 4 are arranged in different groups of first guide slots 31.

There is no difference in a transmission method between the movable push blocks 4 in the two groups of first guide slots 31, and the farthest eccentric ends 212 still pushes the long wall surfaces of the movable slots 42 to achieve motion, such that peristaltic motion in two directions are realized, and a more comprehensive massage effect is produced.

Embodiment 2

As shown in FIGS. 6-9.

The connecting portion 22 is a cylindrical structure, and the eccentric portion 21 is fixed in the connecting portion 22 in an axial direction of the connecting portion 22.

This embodiment provides a specific structure for the transmission assembly 2, where the connecting portion 22 is a cylindrical structure, which can be either a cylinder or a prism; and the connecting portion 22 can be directly and coaxially arranged with the drive motor 1, and the eccentric portion 21 directly protrudes from an axial wall surface of the connecting portion 22. In this embodiment, the transmission assembly 2 can be directly injection-molded, and one single eccentric portion 21 and a section of the connecting portion 22 are considered as one eccentric member.

Further, the eccentric portion 21 can also directly used as a cam structure, the eccentric portion 21 is directly stacked, and an end face of the eccentric portion 21 serves as the connecting portion 22.

Embodiment 3

Figure 7:
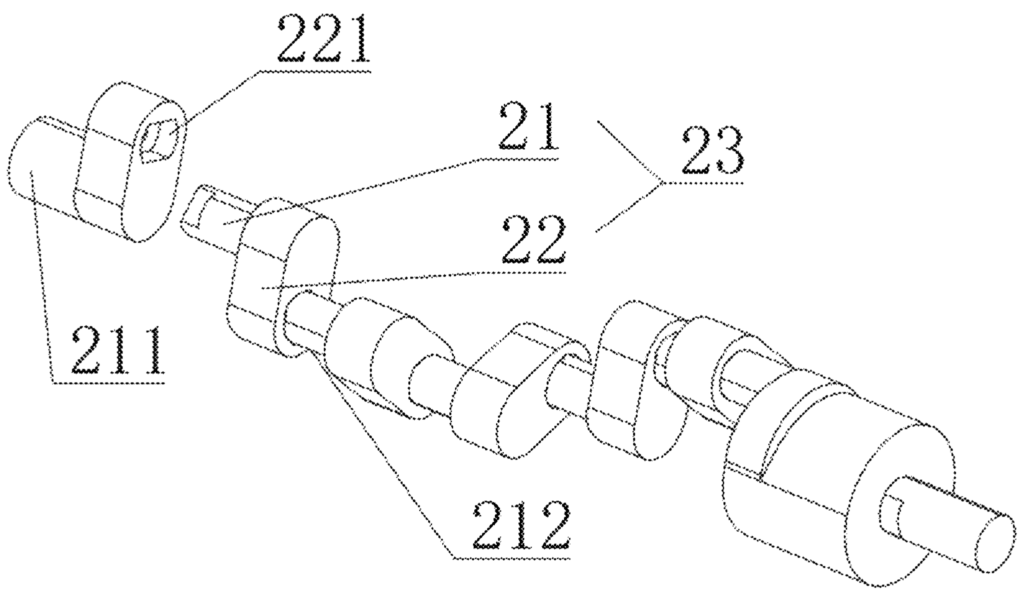
FIG. 7 is a schematic diagram of a three-dimensional structure of a transmission assembly according to another embodiment of the present disclosure.

As shown in FIGS. 7 and 9.

This embodiment provides another specific structure for the transmission assembly 2. Specifically, the eccentric portion 21 is a cylindrical structure;

- the connecting portion 22 is provided with two connecting holes 221, each of which is connected to an adjacent eccentric portion 21; and
- the connecting hole 221 is a non-rotary structure, and the end of the eccentric portion 21 is inserted into and coupled with the connecting hole 221.

The connecting portion 22 is provided with two non-coaxially arranged connecting holes 221, the connecting holes 221 are non-rotary structures, and can be configured as elongated slots. When the eccentric portion 21 is inserted into and coupled with the connecting hole 221, a relative angle is formed between the eccentric portion and the connecting hole, such that a relative angle between adjacent farthest eccentric ends 212 is determined. During assembly, it is unnecessary to separate control the relative angle between the adjacent farthest eccentric ends 212. The above optimal arrangement of the eccentric portions 21 can be formed only by directly inserting the eccentric portion 21 into the connecting hole 221.

Embodiment 4

Figure 10:
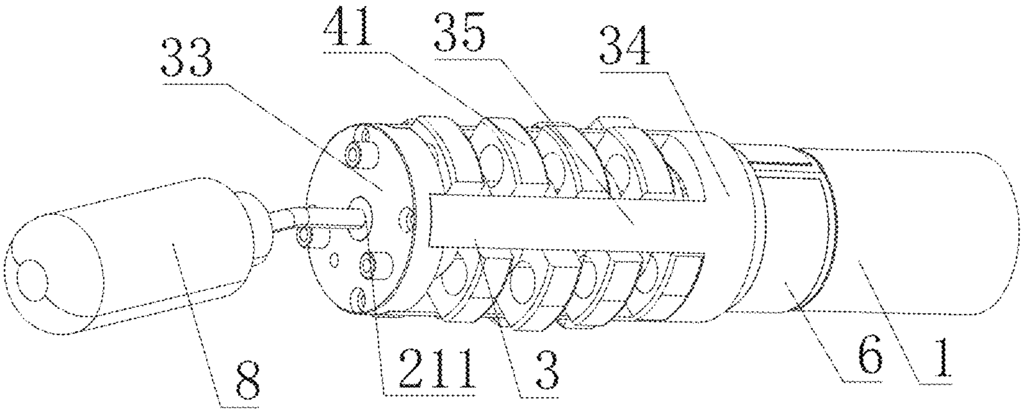
FIG. 10 is a schematic diagram of a three-dimensional structure of a drive mechanism having a rotary functional module according to one embodiment of the present disclosure.
Figure 11:
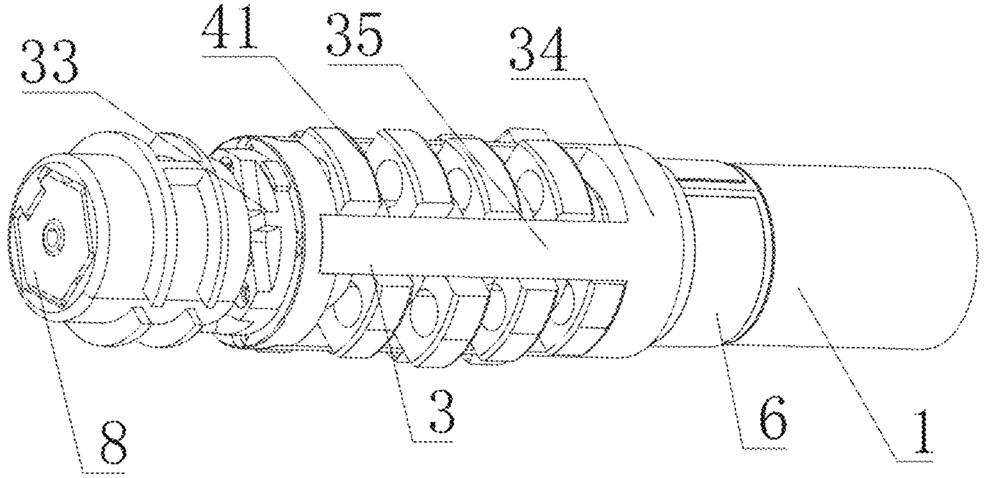
FIG. 11 is a schematic diagram of a three-dimensional structure of a drive mechanism having a telescoping functional module according to one embodiment of the present disclosure.
Figure 12:
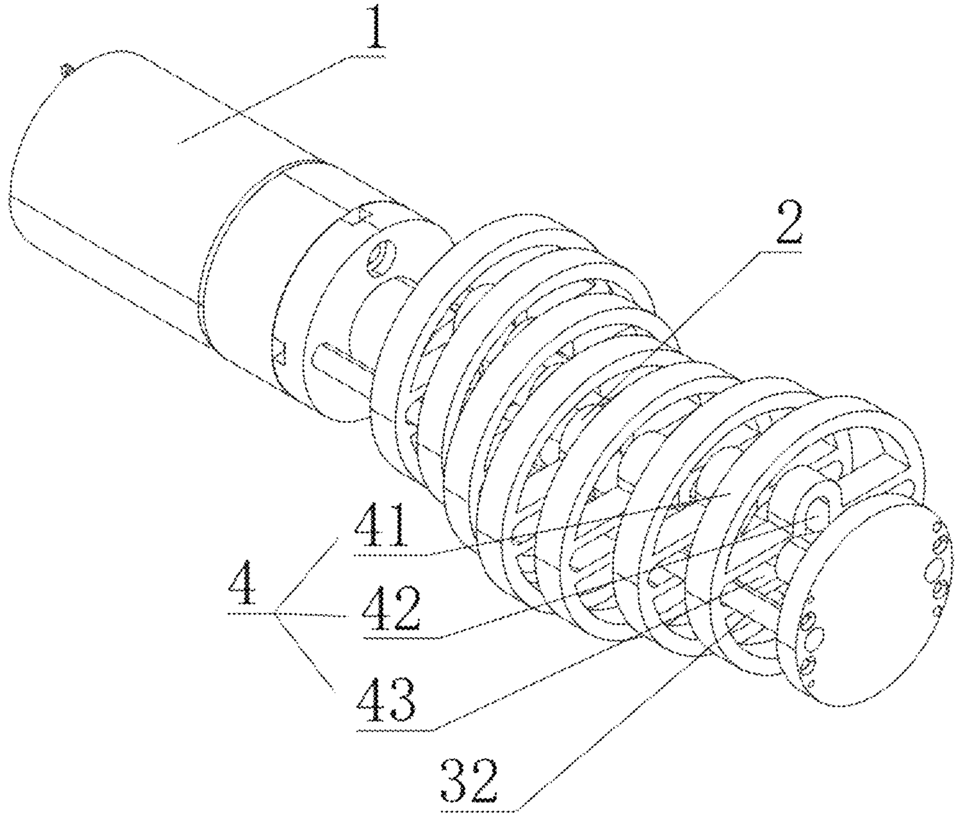
FIG. 12 is a schematic diagram of a three-dimensional structure of a drive mechanism according to Embodiment 6 of the present disclosure.
Figure 13:
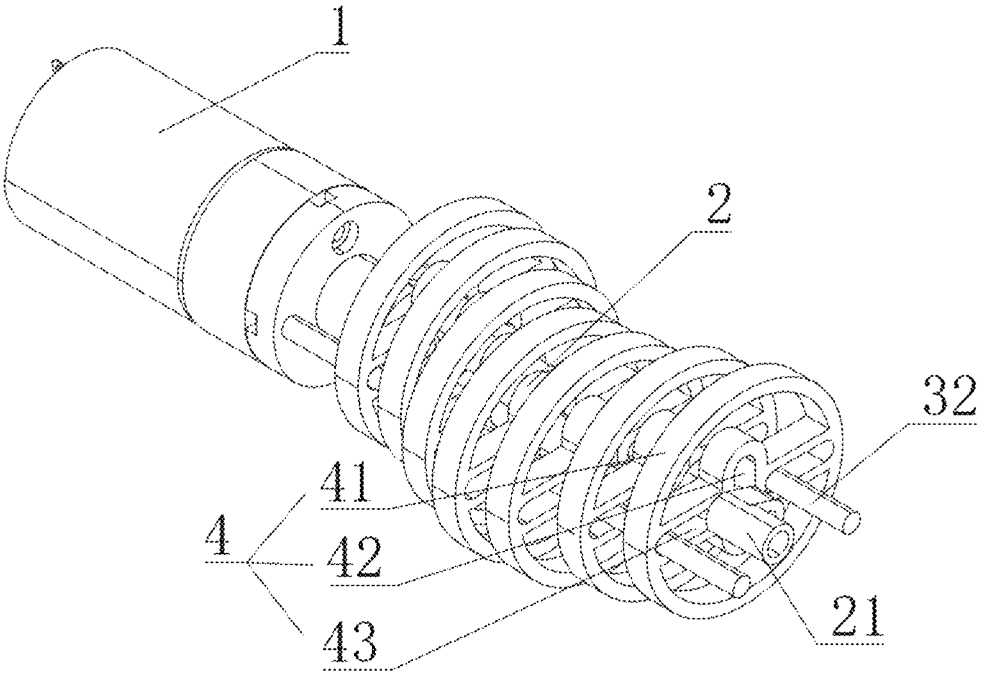
FIG. 13 is a schematic diagram of a three-dimensional structure that an end of the limit bracket in FIG. 11 is hidden.
Figure 14:
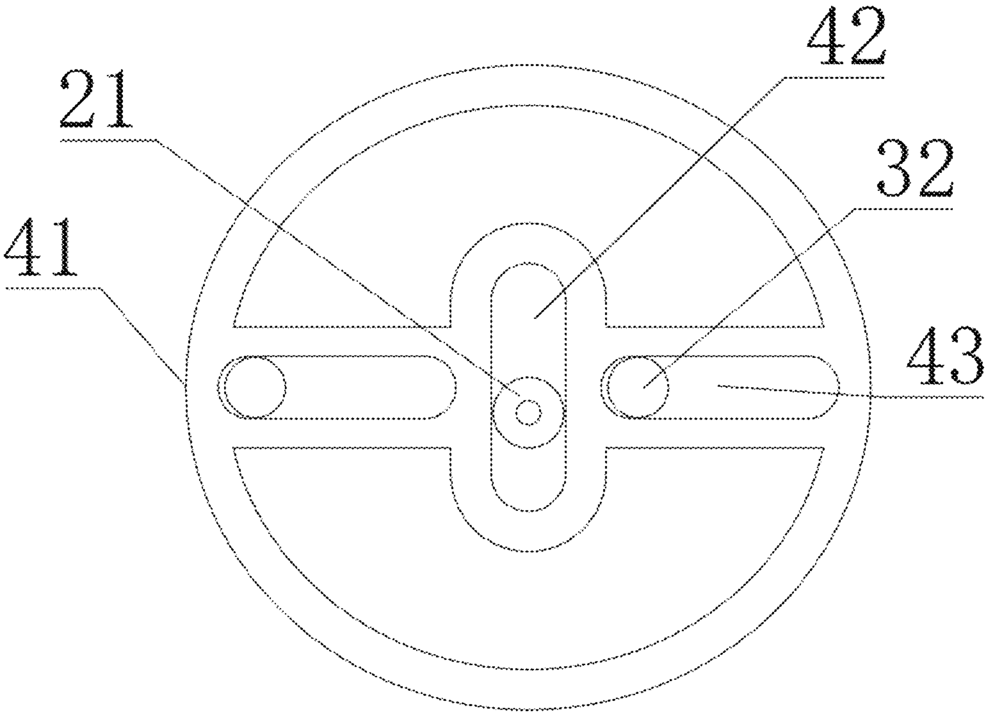
FIG. 14 is a schematic diagram of a connection relationship between a guide column in one form and a second guide slot according to Embodiment 6 of the present disclosure.
Figure 15:
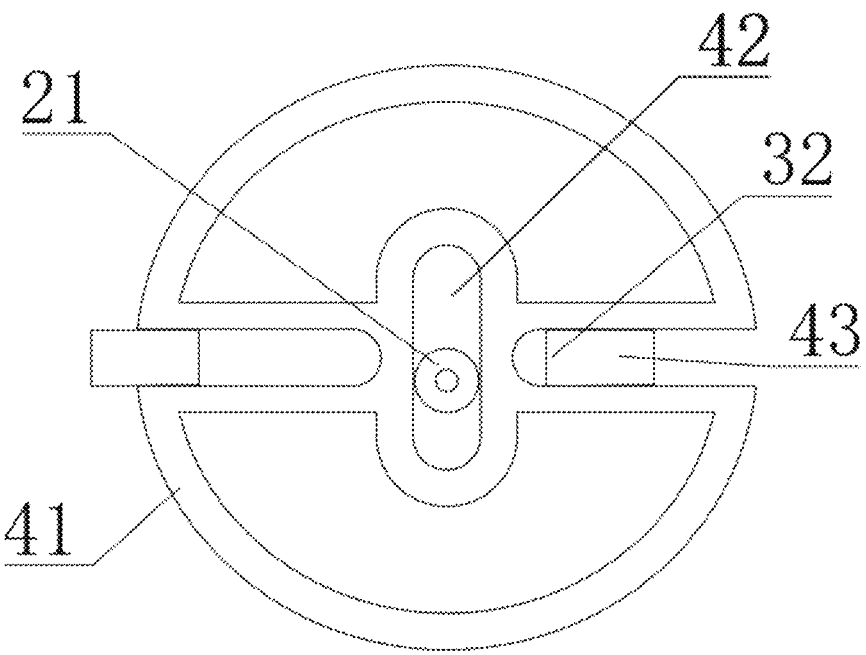
FIG. 15 is a schematic diagram of another connection relationship between a guide column in another form and a second guide slot according to Embodiment 6 of the present disclosure.
Figure 16:
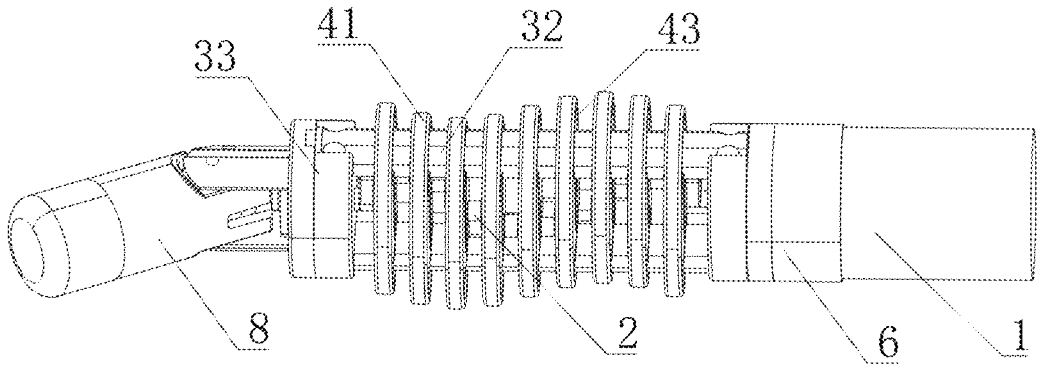
FIG. 16 is a schematic diagram of a three-dimensional structure of a drive mechanism of a guide column in another form according to Embodiment 6 of the present disclosure.
Figure 17:
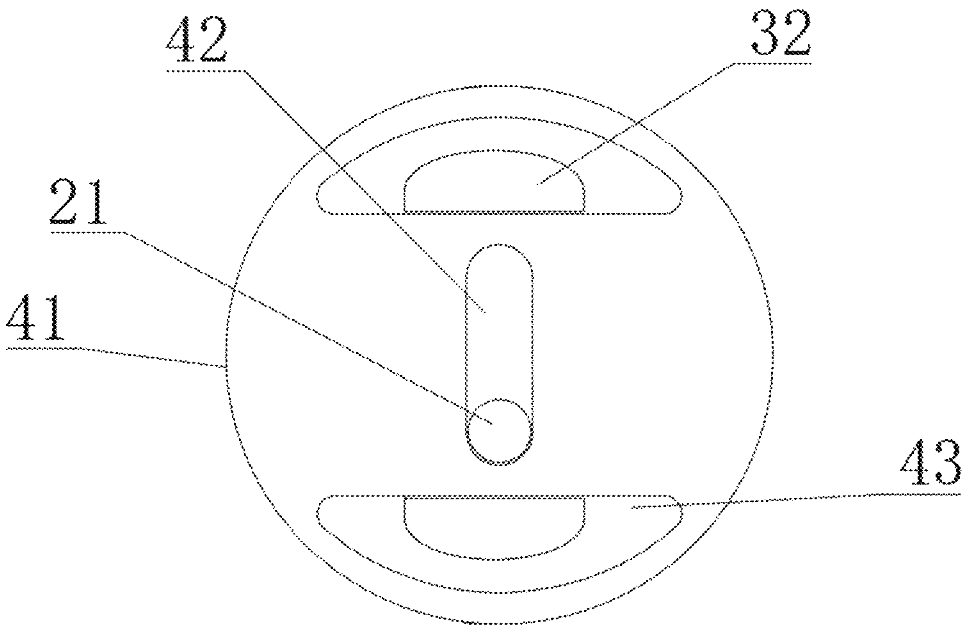
FIG. 17 is a schematic diagram of a connection relationship between a guide column of a driven mechanism in FIG. 16 and a second guide slot.

As shown in FIGS. 10 and 11.

The eccentric portion 21 farthest from the drive motor 1 is the first eccentric portion 211, the first eccentric portion 211 is rotatably connected to the limit bracket 3, and the first eccentric portion 211 is coaxial with the drive motor 1.

The first eccentric portion 211 is connected to the limit bracket 3, the transmission assembly 2 is supported by the limit bracket 3 to prevent the transmission assembly 2 from tilting, and increase an overall stability of the transmission assembly 2.

Further, an end of the first eccentric portion 211 is connected to a functional module 8. The functional module 8 can be a vibration functional module 8, such that the massage head of the massager can produce vibration effect;

- the functional module 8 can be configured as a telescoping functional module, where the first eccentric portion 211 replaces a main shaft of a motor of the conventional telescoping mechanism, for example, the conventional telescoping mechanism includes an output shaft, a sliding sleeve, and a limit sleeve; the first eccentric portion 211 is connected to the output shaft, and an inclined sliding slot is formed in the output shaft; the sliding sleeve is sleeved on the output shaft, and embedded with a ball bearing, the ball bearing abuts against a side wall of the sliding slot; and the limit sleeve is fixedly connected to the limit bracket 3, is sleeved on the sliding sleeve to limit rotation of the sliding sleeved. The first eccentric portion 211 drives the output shaft to rotate, and walls of the sliding slot drives the sliding sleeve to move.

The functional module 8 can be configured as a rotary functional module, where the first eccentric portion 211 is connected to an output shaft having a bending angle, one end of the output shaft is offset from the first eccentric portion 211, such that when the first eccentric portion 211 drives the output shaft to rotate, the end of the output shaft will trace a circular trajectory about an axis of the first eccentric portion 211.

The functional module 8 can also be configured as an oscillating functional module 8, where the first eccentric portion 211 is additionally connected to one eccentric portion 21, and the functional module 8 is provided with an oscillating rod, the oscillating rod is hinged to the limit bracket 3, and the eccentric portion 21 drives the oscillating rod to oscillate.

Embodiment 5

As shown in FIG. 1.

A vibration motor 5 is arranged on a circumferential wall surface of the limit bracket 3 or on the pushing portion 41.

In this embodiment, the vibration motor 5 is arranged on the circumferential wall surface of the limit bracket 3, such that a middle section of the massager produces vibration. Unlike most massagers with vibration functions at the front end, the vibration motor 5 at the front end is hard to transmit vibration effect to the middle section of the massager. By arranging the vibration motor 5 on the circumferential wall surface of the limit bracket 3 or on the pushing portion 41, the vibration in the middle section can be synchronized with the peristaltic in the present disclosure, improving the vibration effect during peristaltic massage.

The specific arrangement in the limit bracket 3 and in the pushing portion 41 has different effect. When the vibration motor is arranged on the circumferential wall surface of the limit bracket 3, the entire drive mechanism can produce a more obvious vibration as a whole, such that each pushing portion 41 experiences the vibration. When the vibration motor 5 is arranged on the pushing portion 41, one specific pushing portion 41 will exhibit a strong vibration, and the motion of the pushing portion 41 will cause the human body to feel continuously changing vibrations.

Embodiment 6

As shown in FIGS. 12-17.

The limit bracket 3 is provided with a guide column 32, and an axis direction of the guide column 32 is parallel to the first rotary shaft 11.

the movable push block 4 is provided with a second guide slot 43;

the guide column 32 extends through the second guide slot 43; and long wall surfaces on two sides of the second guide slot 43 abut against the guide column 32, a spacing between wide wall surfaces on the two sides of the second guide slot 43 provides a space for the guide column 32 to slide, and the length direction of the second guide slot 43 is parallel to the width direction of the movable slot 42.

This embodiment provides a novel structure for limiting and guiding the movable push block 4.

The limit bracket 3 is not provided with the first guide slot 31 any longer, but a guide column 32 is arranged instead, and an axis of the guide column 32 is parallel to an axis it abuts against; and the guide column 32 can be configured as a cylinder, a prism, a rounded rectangular column, or an elliptical column. The movable push block 4 is provided with a second guide slot 43, the guide column 32 extends through the second guide slot 43, and the guide column 32 can slide in the length direction of the second guide slot 43. In a most simplified state, the limit bracket 3 itself is just a guide column 32, one end of the guide column 32 is connected to a housing of the drive motor 1, and the other end of the guide column 32 is connected to the housing of the massager. However, it should be noted that when only one single guide column 32 is used for limiting, the guide column 32 cannot be configured as a cylindrical structure. When the movable push block 4 deflects, the guide column 32 can abut against the two long wall surfaces of the second guide slot 43 simultaneously, thereby preventing the movable push block 4 from rotating about the guide column 32.

For example, the guide column 32 is a regular square prism, and a width of the second guide slot 43 is slightly larger than a side length of a cross section of the guide column 32, and the guide column 32 can just be inserted into the second guide slot 43. A length of the second guide slot 43 is not equal to the width of the second guide slot, and the length is surely greater than the width, so the guide column 32 can slide in a length direction of the second guide slot 43 by a certain distance.

The second guide slot 43 does not necessarily have two long wall surfaces and two wide wall surfaces. One of the wide wall surfaces of the second guide slot 43 can be omitted, such that the guide column 32 to can slide in the length direction of the second guide slot 43 until it protrudes from the second guide slot 43. However, it should be noted that the protruding from the second guide slot 43 does not completely disengage from the second guide slot 43, but only a portion of the guide column 32 disengages from the second guide slot 43, and at least a portion of the guide column remains in the second guide slot 43.

In a most ideal state, two second guide slots 43 and two guide columns 32 are arranged, and the second guide slots 43 are respectively arranged on both sides of the width direction of the movable slot 42. When the movable push block 4 rotates, one of the guide columns 32 abuts against a long wall surface on one side of one of the second guide slots 43, and the other guide column 32 abuts against a long wall surface on the other side of the other second guide slot 43, thereby preventing the movable push block 4 from rotating.

More further, the guide column 32 is configured as a cylindrical structure, where when a circumferential wall surface of the cylindrical structure is in contact with a long wall surface of the second guide slot 43, a contact area is much smaller than that of the guide column 32 in other shapes, such that friction force between the guide column 32 and the second guide slot 43 is greatly reduced, the movable push block 4 can slide more smoothly, and noise produced by the movable push block 4 during its sliding motion can be reduced.

Moreover, the guide column 32 is rotatably connected to the limit bracket 3, such that rolling friction is formed between the second guide slot 43 and the guide column 32 when the movable push block 4 moves, further reducing a frictional resistance during the sliding motion of the movable push block 4.

Further, the pushing portion 41 is an annular structure, and surrounds both the second guide slot 43 and the movable slot 42. For the drive mechanism in this embodiment, a limiting assembly is located inside a pushing block (that is, a the guide column 32 is located inside the second guide slot 43), and the pushing portion 41, as an outermost structure of the movable push block 4, is in direct contact with the silicone outer layer 7 of the massager, therefore, a shape of the pushing portion 41 will greatly affect a shape of the massager. In this embodiment, the pushing portion 41 is configured as the annular structure to provide support for the silicone outer layer 7, ensuring that an entire circumference of the silicone outer layer 7 is supported.

Further, a circumferential contour of the pushing portion 41 forms an ellipse, and a long axis of the ellipse is parallel to the width direction of the movable slot 42. During motion, the pushing portion 41 compresses the silicone outer layer 7, so the silicone outer layer 7 will be deformed. The silicone outer layer 7 is a flexible layer, the smaller the area under compression, the easier the silicone outer layer is deformed, that is, when the applied force remains unchanged, the smaller the contact area, the greater the pressure on an object. A curvature at both ends of the long axis of the ellipse is smaller, and the long axis of the ellipse is parallel to the width direction of the movable slot 42; and when the movable push block 4 moves, the silicone outer layer 7 is compressed by the end with a smaller curvature, such that the drive motor 1 can compress and deform the silicone outer layer 7 by applying smaller force. In addition, the ellipse is directional, the user can easily identify a direction of crawling action of the massager, and the massager can be inserted into the human body for peristalsis by taking the long axis of the ellipse as a reference.

Embodiment 7

Figure 18:
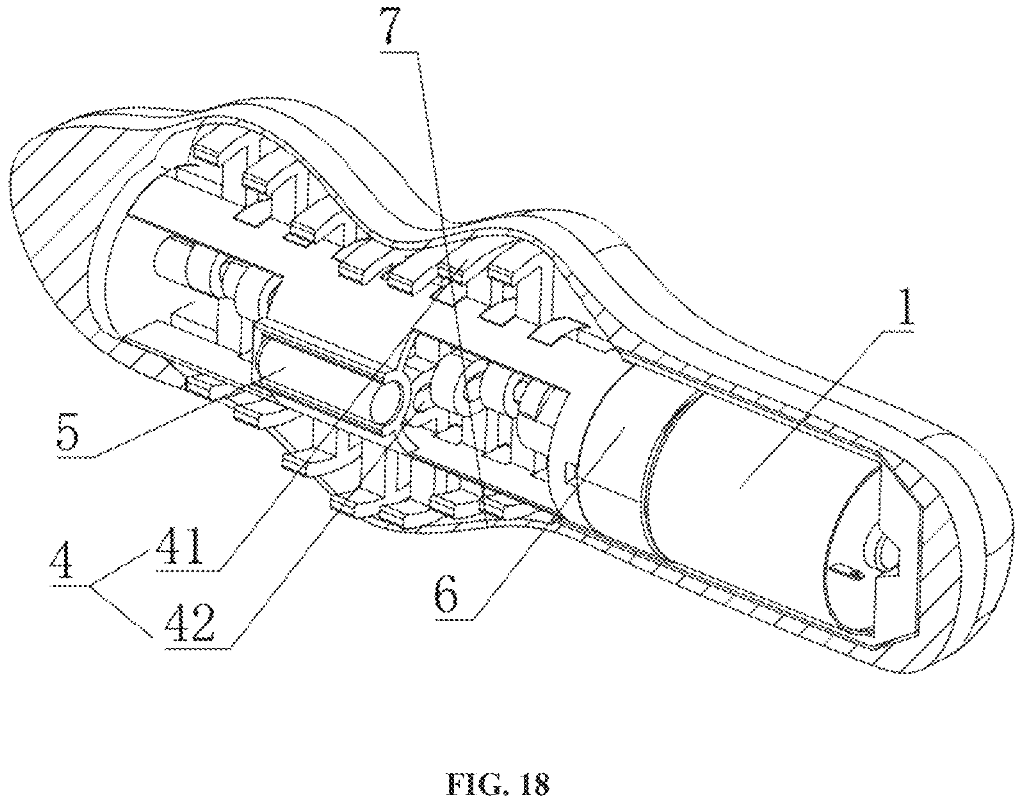
FIG. 18 is a structural schematic diagram of a massager according to the present disclosure.

As shown in FIG. 18.

A massager, including the drive mechanism in any of the above embodiments, further including a housing and a silicone outer layer 7, the drive motor 1 and the limit bracket 3 are is fixedly connected to the housing, and the pushing portion 41 of the movable push block 4 abuts against an inner wall surface of the silicone outer layer 7.

A plurality of the pushing portions 41 continuously slide and compress the silicone outer layer 7 of the massager in a fixed sequence (an arrangement sequence of the eccentric portions 21), and the silicone outer layer 7 is in contact with the human body to provide a massage function.

In the description of the embodiments of the present disclosure, it should be understood that orientations or positional relationships indicated by the terms "up," "down," "front," "rear," "left," "right," "vertical," "horizontal," "center," "top," "bottom," "top side," "bottom side," "inner," "outer", "inner side," "outer side," etc. are based on the orientations or positional relationships shown in the accompanying drawings and are merely for facilitating the description of the present disclosure and simplifying the description, rather than indicating or implying that a device or an element referred to must have a particular orientation or be constructed and operated in a particular orientation, and thus will not be interpreted as limiting the present disclosure. Specifically, "inner side" refers to an internal or enclosed area or space. "Outer side" refers to an area surrounding a specific component or region.

In the description of embodiments the present disclosure, the terms "first", "second", "third" and "fourth" are used for descriptive purposes only, and cannot be construed as indicating or implying relative importance or implicitly indicating the number of technical features indicated. Thus, features defined by "first", "second", "third" and "fourth" may explicitly or implicitly include one or more of the features. In the description of the present disclosure, "plurality of" means two or more, unless otherwise specified.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A massager drive mechanism, comprising a drive motor, a transmission assembly, a limit bracket, and movable push blocks;

the movable push blocks respectively comprise movable slots and pushing portions;

the transmission assembly comprises eccentric joints, and the eccentric joints respectively comprise connecting portions and eccentric portions; each of the connecting portions is configured to connect two of the eccentric joints adjacent to the respective connecting portion; and each of the eccentric portions abuts against a corresponding one of the movable slots;

a rotary shaft of the drive motor serves as a first rotary shaft;

a farthest point on each of the eccentric portions from the first rotary shaft is a farthest eccentric end to thereby make the eccentric portions respectively have farthest eccentric ends, and a line connecting any two adjacent farthest eccentric ends of the farthest eccentric ends forms a non-zero first included angle with the first rotary shaft; and the limit bracket is connected to the movable push blocks in a sliding manner, and a sliding direction of each of the movable push blocks is parallel to a width direction of the movable slot of each of the movable push blocks.

2. The massager drive mechanism according to claim 1, wherein a length of each of the movable slots is set as L1, a width of each of the movable slots is set as L2, and a distance between the farthest eccentric end on each of the eccentric portions and an axis of the drive motor is L3;

$$0.5L\times1\geq L3>L2.$$

3. The massager drive mechanism according to claim 1, wherein the limit bracket is provided with first guide slots, and a depth direction of each of the first guide slots is parallel to the width direction of a corresponding one of the movable slots; and an end of each of the pushing portions protrudes from a circumferential contour of the limit bracket in the depth direction of a corresponding one of the first guide slots.

4. The massager drive mechanism according to claim 3, wherein each of the pushing portions penetrates through a circumferential wall surface of the limit bracket;

each of the movable push blocks is provided with two of the pushing portions, and the two pushing portions protrude from the width direction of a corresponding one of the movable slots.

5. The massager drive mechanism according to claim 4, wherein two ends of the limit bracket in a length direction of the limit bracket serve as a first connecting end and a second connecting end respectively, and the first connecting end and the second connecting end are connected by connecting arms, and the connecting arms are arranged about a main shaft of the drive motor;

a gap between two adjacent connecting arms of the connecting arms forms one of the first guide slots; and a length direction of each of the first guide slots is parallel to the length direction of the limit bracket, and a width direction of the gap is the width direction of a corresponding one of the first guide slots.

6. The massager drive mechanism according to claim 5, wherein the first guide slots are four in number, and the connecting arms define the four first guide slots; wherein two non-adjacent first guide slots of the four first guide slots form one group of first guide slots, and thereby two groups of first guide slots are defined, depth directions of the two non-adjacent first guide slots are parallel to each other, and depth directions of two adjacent first guide slots of the four first guide slots are perpendicular to each other; and length directions of the movable slots of two adjacent movable push blocks of the movable push blocks are perpendicular to each other, and the pushing portions of the two adjacent movable push blocks are respectively arranged in the two non-adjacent first guide slots.

7. The massager drive mechanism according to claim 1, wherein distances between each of the farthest eccentric ends and the first rotary shaft are equal.

8. The massager drive mechanism according to claim 1, wherein each of the connecting portions is a cylindrical structure, and each of the eccentric portions is fixed in a corresponding one of the connecting portions in an axial direction of the corresponding one of the connecting portions.

9. The massager drive mechanism according to claim 1, wherein each of the eccentric portions is a cylindrical structure; and each of the connecting portions is provided with two connecting holes, and each of the two connecting holes is connected to the respective eccentric portion adjacent to the respective connecting portion; and each of the connecting holes is a non-rotary structure, and an end of each of the eccentric portions is inserted into and coupled with the respective connecting hole of the respective connecting portion.

10. The massager drive mechanism according to claim 1, wherein an eccentric portion of the eccentric portions farthest from the drive motor is a first eccentric portion, the first eccentric portion is rotatably connected to the limit bracket, and the first eccentric portion is coaxial with the drive motor.

11. The massager drive mechanism according to claim 10, wherein the first eccentric portion is connected to a vibration functional module, a telescoping functional module, or a rotary functional module.

12. The massager drive mechanism according to claim 1, wherein a vibration motor is arranged on a circumferential wall surface of the limit bracket.

13. The massager drive mechanism according to claim 1, wherein a vibration motor is arranged on the pushing portions.

14. The massager drive mechanism according to claim 1, wherein the limit bracket is provided with a guide column, and an axis direction of the guide column is parallel to the first rotary shaft;

each of the movable push blocks is provided with a second guide slot;

the guide column extends through the second guide slot of each of the movable push blocks and slides in a length direction of the second guide slot of each of the movable push blocks, and the length direction of the second guide slot of each of the movable push blocks is parallel to the width direction of the movable slot of the respective movable push block; and long wall surfaces on two sides of the second guide slot of each of the movable push blocks abut against the guide column.

15. The massager drive mechanism according to claim 14, wherein two guide columns are arranged on the limit bracket, and two second guide slots are arranged in each of the movable push blocks, the two guide columns are respectively arranged in the two second guide slots.

16. The massager drive mechanism according to claim 15, wherein each of the two guide columns is a cylindrical structure.

17. The massager drive mechanism according to claim 16, wherein each of the two guide columns is rotatably connected to the limit bracket.

18. The massager drive mechanism according to claim 14, wherein the pushing portion of each of the movable push blocks is an annular structure, and encloses the second guide slot of the respective movable push block and the movable slot of the respective movable push block.

19. The massager drive mechanism according to claim 18, wherein a circumferential contour of the pushing portion of each of the movable push blocks forms an ellipse, and a long axis of the ellipse is parallel to the width direction of the movable slot of the respective movable push block.

20. A massager, comprising a massager drive mechanism, wherein the massager drive mechanism comprises a drive motor, a transmission assembly, a limit bracket, and movable push blocks; wherein the movable push blocks respectively comprise movable slots and pushing portions;

the transmission assembly comprises eccentric joints, and the eccentric joints respectively comprise connecting portions and eccentric portions; each of the connecting portions is configured to connect two of the eccentric joints adjacent to the respective connecting portion; and each of the eccentric portions abuts against a corresponding one of the movable slots;

a rotary shaft of the drive motor serves as a first rotary shaft;

a farthest point on each of the eccentric portions from the first rotary shaft is a farthest eccentric end to thereby make the eccentric portions respectively have farthest eccentric ends, and a line connecting any two adjacent farthest eccentric ends of the farthest eccentric ends forms a non-zero first included angle with the first rotary shaft;

the limit bracket is connected to the movable push blocks in a sliding manner, and a sliding direction of each of the movable push blocks is parallel to a width direction of the movable slot of each of the movable push blocks; and the massager further comprises a housing and a silicone outer layer, the drive motor and the limit bracket are fixedly connected to the housing, and the pushing portions of the movable push blocks abuts against an inner wall surface of the silicone outer layer.

* * * * *